(12) United States Patent
Shilale et al.

(10) Patent No.: US 7,308,983 B2
(45) Date of Patent: Dec. 18, 2007

(54) CONTINUOUSLY CONNECTED FASTENER STOCK AND METHOD OF MANUFACTURING THE SAME

(75) Inventors: Thomas Shilale, Douglas, MA (US); William J. Cooper, Woonsocket, RI (US); Steven E. Flannery, Wayland, MA (US); Jeffrey A. Raymond, Leominster, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/938,283

(22) Filed: Aug. 23, 2001

(65) Prior Publication Data

US 2003/0011097 A1     Jan. 16, 2003

Related U.S. Application Data

(63) Continuation-in-part of application No. 09/904,173, filed on Jul. 12, 2001, now Pat. No. 6,569,369.

(51) Int. Cl.
*B65D 85/24* (2006.01)

(52) U.S. Cl. ...................................... 206/346; 206/820

(58) Field of Classification Search ................ 206/338, 206/343–348, 820; D8/382; 264/145
See application file for complete search history.

(56) References Cited

U.S. PATENT DOCUMENTS

| | | | |
|---|---|---|---|
| 3,103,666 A | 9/1963 | Bone | |
| 4,231,826 A | 11/1980 | Wrast et al. | |
| 4,276,255 A * | 6/1981 | Russell | 264/288.8 |
| 4,461,738 A | 7/1984 | Russell | |
| 4,712,677 A | 12/1987 | Russell | |
| 5,615,816 A * | 4/1997 | Deschenes et al. | 227/71 |
| 5,949,336 A | 9/1999 | Deschenes et al. | |
| 5,979,027 A | 11/1999 | Oh et al. | |
| 5,987,719 A | 11/1999 | Cooper | |
| 6,064,306 A | 5/2000 | Deschenes et al. | |
| 6,129,206 A * | 10/2000 | Cooper | 206/343 |
| 6,173,836 B1 * | 1/2001 | Cooper | 206/346 |

(Continued)

OTHER PUBLICATIONS

Commonly-owned, pending U.S. Appl. No. 09/740,700, inventors Charles L. Deschenes and Daniel Gilbertson, filed Dec. 19, 2000.

*Primary Examiner*—Jila M Mohandesi
(74) *Attorney, Agent, or Firm*—Kriegsman & Kriegsman

(57) ABSTRACT

Continuously connected fastener stock and a method of making same. The method, in one embodiment involves providing a rotating molding wheel, the wheel being provided with a peripheral impression comprising a pair of peripherally-extending side members interconnected by a plurality of cross-links. Molten plastic is extruded into the peripheral impression of the wheel, with a layer of controlled film overlying the peripheral impression. The molten plastic is then allowed to solidify. A knife in substantially elliptical contact with the peripheral impression is then used to skive excess plastic from the rotating molding wheel. The knife is provided with a pair of cut-out portions along its bottom edge, each cut-out portion being aligned with one of the peripherally-extending side members so as to augment the transverse cross-sectional size thereof. The continuously connected fastener stock thus formed is then removed from the rotating molding wheel. The fastener stock includes in one embodiment first and second side members each being generally circular in cross-section and a plurality of cross-links each having a flat surface.

11 Claims, 18 Drawing Sheets

U.S. PATENT DOCUMENTS 6,318,553 B1 * 11/2001 Deschenes ................. 206/343
6,433,106 B1 * 8/2002 Mori et al. ................. 525/399
6,569,369 B2 * 5/2003 Shilale et al. ............... 264/167
6,602,637 B1 * 8/2003 Kurasawa et al. .......... 429/176

* cited by examiner

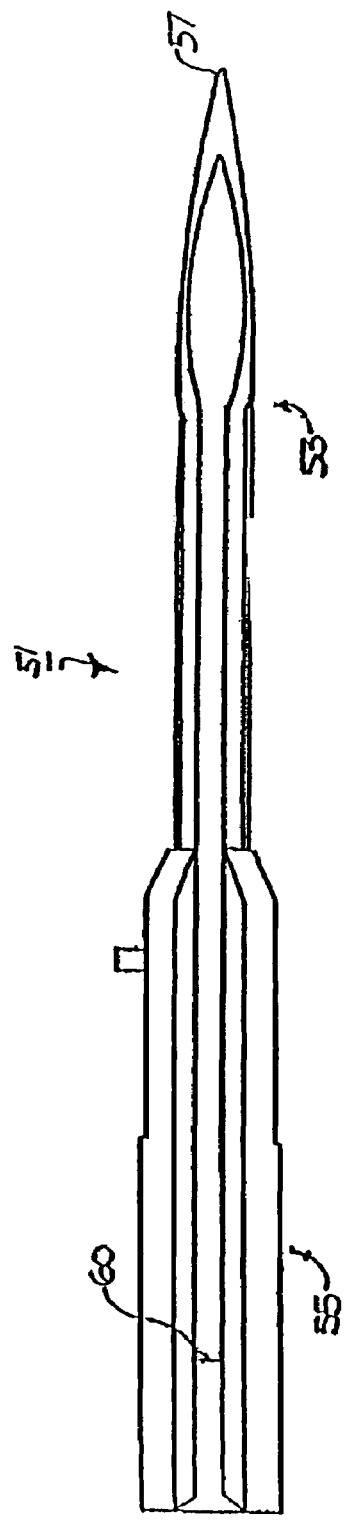
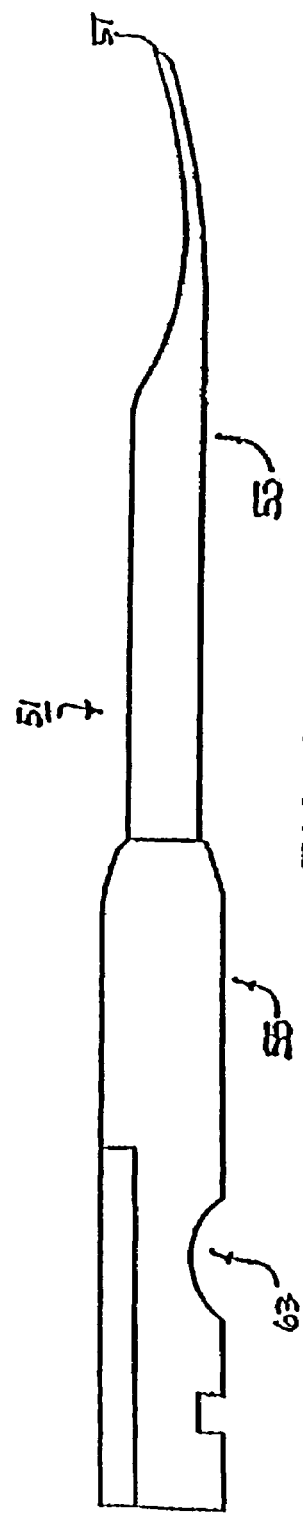
FIG. 3 PRIOR ART
FIG. 4 PRIOR ART

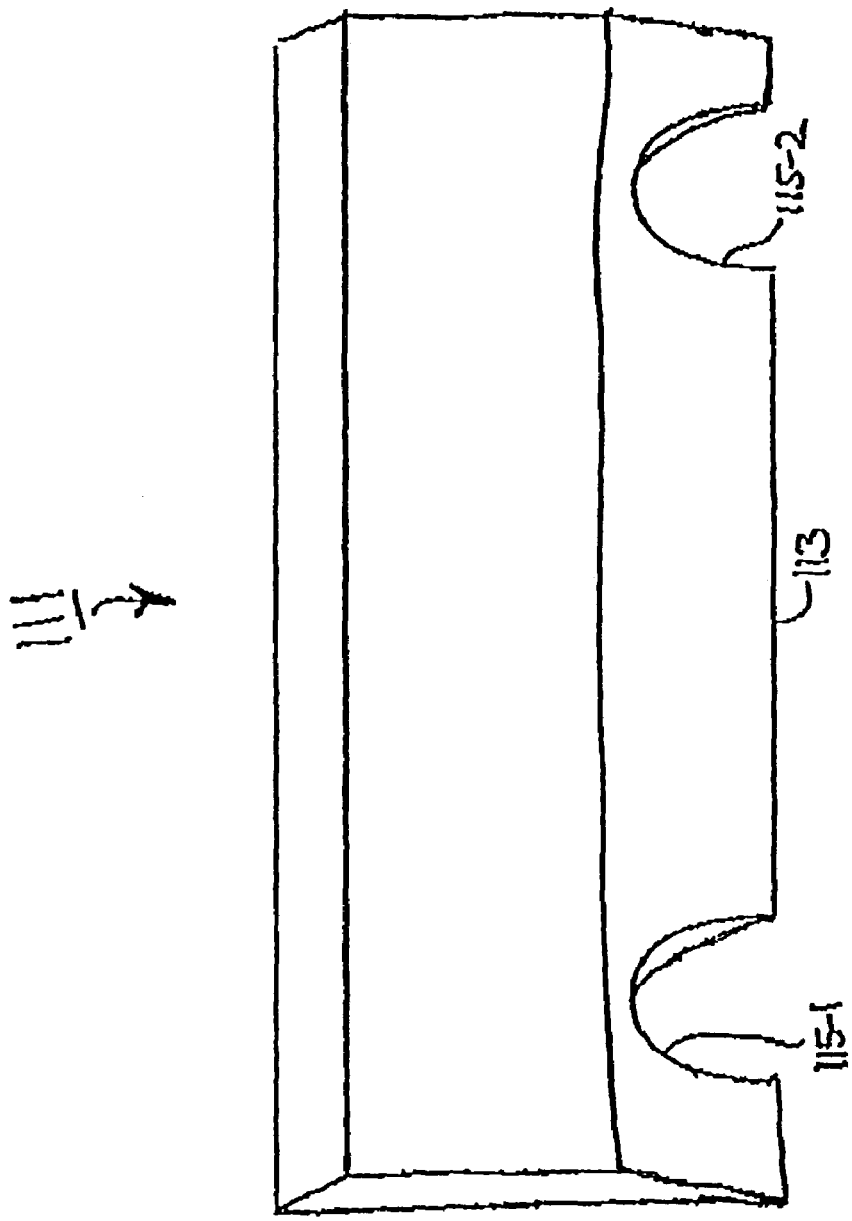

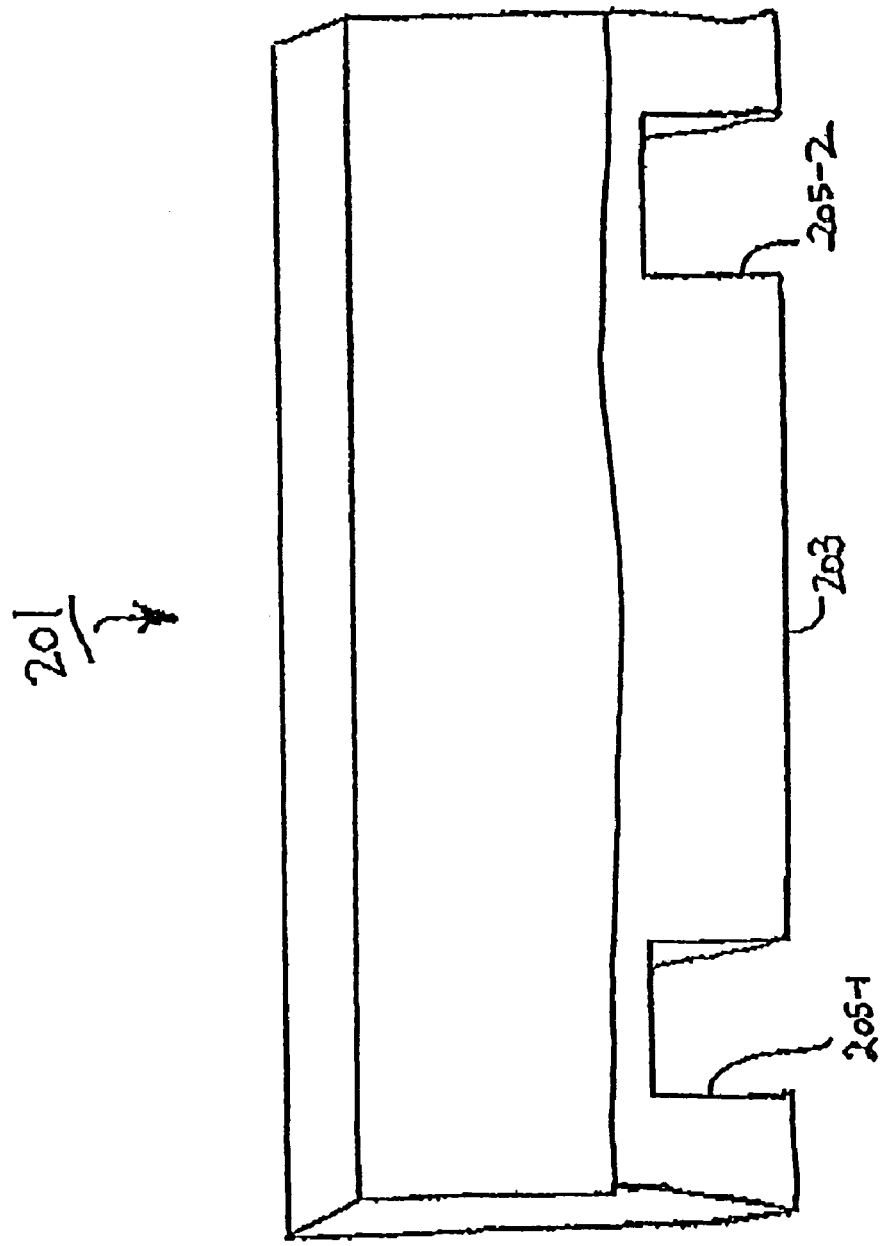
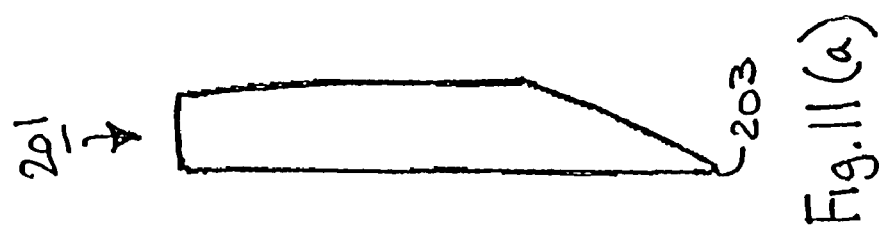

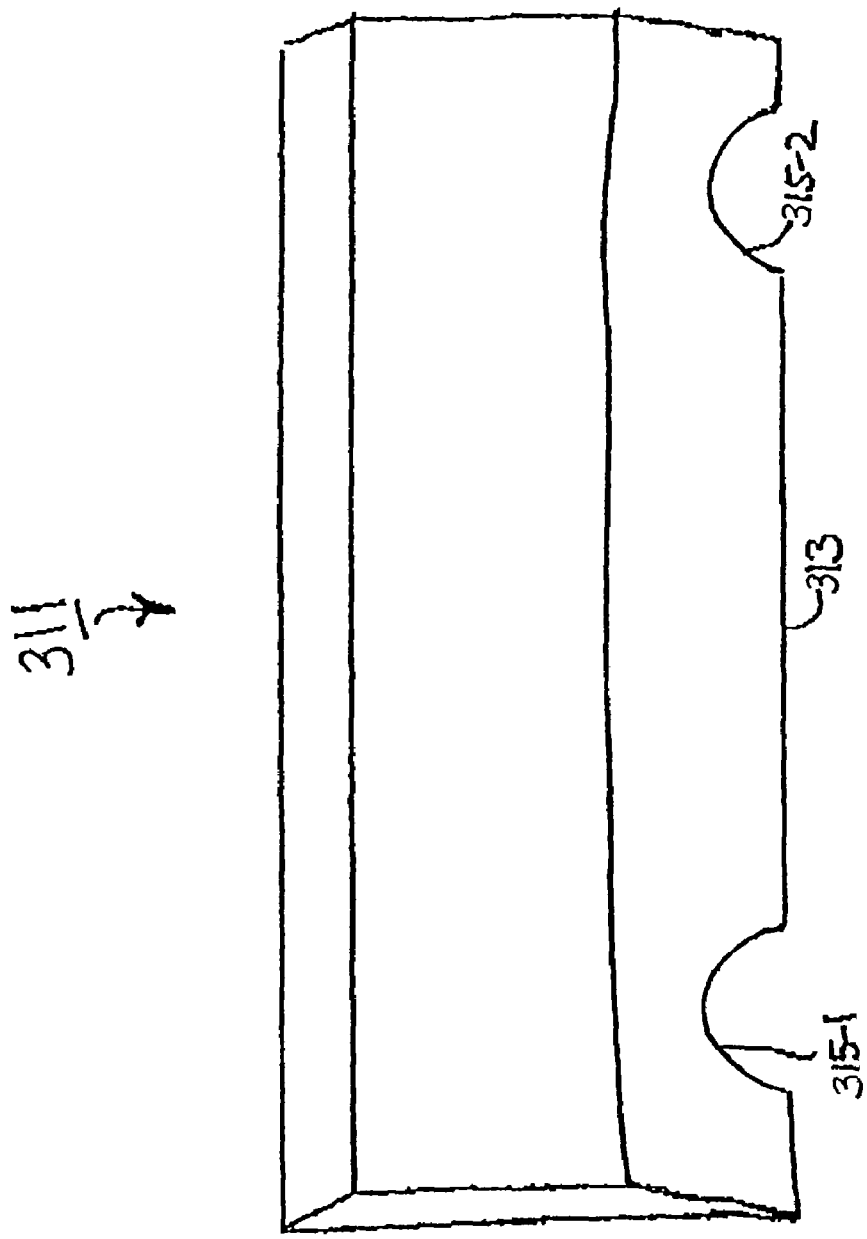
Fig. 18(b)
Fig. 18(a)

CONTINUOUSLY CONNECTED FASTENER STOCK AND METHOD OF MANUFACTURING THE SAME

CROSS-REFERENCE TO RELATED APPLICATIONS

The present application is a continuation-in-part of U.S. patent application Ser. No. 09/904,173, inventors Thomas Shilale and William J. Cooper, filed Jul. 12, 2001 now U.S. Pat. No. 6,569,369, the disclosure of which is incorporated herein by reference.

BACKGROUND OF THE INVENTION

The present invention relates generally to plastic fasteners of the type that are adapted, for example, to attach tags to articles of commerce and relates more particularly to a novel method of manufacturing a plurality of said plastic fasteners as continuously connected fastener stock, to the continuously connected fastener stock thus made, to individual fasteners derived from said continuously connected fastener stock and to needles designed for use with said continuously connected fastener stock.

Plastic fasteners of the type comprising an elongated flexible filament having a first cross-bar at one end and a second cross-bar (or other enlargement, such as a paddle or a knob) at the opposite end are well-known and have been widely used in a variety of applications, such as in the attachment of merchandise tags to articles of commerce, in the attachment of buttons to garments, in the lasting of shoes, and in various packaging applications. Typically, such plastic fasteners are mass-produced by molding processes into either one of two different types of assemblies. One such assembly, an example of which is disclosed in U.S. Pat. No. 3,103,666, inventor Bone, issued Sep. 17, 1963 (which patent is incorporated herein by reference), is a clip-type assembly, said clip comprising a plurality of fasteners, each such fastener comprising a flexible filament having a first cross-bar at one end thereof and a paddle or second cross-bar at the opposite end thereof. The fasteners are arranged in a spaced, side-by-side orientation, with the respective first cross-bars parallel to one another and the respective paddles or second cross-bars parallel to one another, each of the first cross-bars being joined to a common, orthogonally-disposed runner bar by a severable connector. Adjacent second cross-bars or paddles also maybe interconnected by severable connectors extending therebetween.

The aforementioned fastener clip is typically made by injection molding. Several commercial embodiments of the above-described fastener clip have been sold by the present assignee, Avery Dennison Corporation, as DENNISON® SWIFTACH® fastener clips.

A second type of fastener assembly is known as continuously connected fastener stock. In one type of continuously connected stock, the fastener stock is formed from two elongated, uniform and continuous side members coupled together by a plurality of cross-links equidistantly-spaced apart by a distance of 0.25 inch. Individual fasteners having an H-shape, often referred to as "plastic staples," are dispensed from the fastener stock by cutting the side members at appropriate points between cross-links, thereby yielding individual fasteners having cross-bars of 0.25 inch in length. In another type of continuously connected stock, the fasteners comprise a flexible filament having a cross-bar at one end thereof and a paddle (or second cross-bar) at the opposite end thereof, the respective cross-bars and paddles of successive fasteners being arranged end-to-end and being joined together by severable connectors to form continuous, albeit non-uniform, side members.

An example of continuously connected fastener stock is disclosed in U.S. Pat. No. 4,039,078, inventor Bone, issued Aug. 2, 1977 (which patent is incorporated herein by reference). In said patent, the continuously connected fastener is described as being made by one of two different methods. The first of said two methods comprises extruding a continuous strip of plastic and then punching out or forming apertures in the strip in such a way as to leave only the side members and the cross-links in the strip, said side members and said cross-links being rectangular in cross-section. The other of said two methods comprises injection molding two or more separate lengths of the fastener stock and then joining together the lengths by applying heat to weld the respective side members together, said side members and said cross-links being circular in cross-section.

Neither of the two methods described above has received much, if any, commercial use in the manufacturing of continuously connected fastener stock.

Another example of continuously connected fastener stock is described in U.S. Pat. No. 4,462,784, inventor Russell, issued Jul. 31, 1984 (which patent is incorporated herein by reference). In said patent, the continuously connected fastener stock is made by a rotary extrusion process that involves the use of a rotating molding wheel whose periphery is provided with molding cavities that are complementary in shape to the molded fastener stock. To form fasteners, plastic is extruded into the cavities of the molding wheel, and a knife in substantially elliptical contact with the wheel is used to skive excess plastic from the molding wheel, leaving plastic only in the molding cavities. Following molding, the filament portions of the fasteners are typically stretched.

The aforementioned rotary extrusion technique has been used extensively by the present assignee in the manufacturing of continuously connected fastener stock. As can readily be appreciated, some advantages of the above-described rotary extrusion technique, as compared to the injection molding/welding technique described above, are that virtually any length of fastener stock can be obtained and that the post-molding welding step is eliminated.

However, one consequence of the rotary extrusion process described above, particularly the skiving step thereof, is that the first cross-bar, the filament, and the second cross-bar (or paddle) of each fastener are all flat on one side thereof, with the flattened sides of the first cross-bar, the filament and the second cross-bar all lying in the same plane (see e.g., FIG. 1B of U.S. Pat. No. 4,462,784). The other surfaces of the first-cross bar, the filament, and the second cross-bar (or paddle) conform to the shapes of the molding cavities and are typically not flat. For example, the other surface of the cross-bar (and the filament) is typically curved, thereby resulting in a cross-bar (and a filament) whose transverse cross-section has a shape resembling a semicircle or semi-ellipse. This property of the continuously connected stock of U.S. Pat. No. 4,462,784 of being shaped so as to be flat on only one side is apparently not shared by the continuously connected fastener stock of U.S. Pat. No. 4,039,078.

Tools (often referred to as "tagging guns" or "fastener attaching tools") for dispensing individual fasteners from continuously connected fastener stock above are known, examples of such tools being disclosed in the following U.S. patents, all of which are incorporated herein by reference: U.S. Pat. No. 4,039,078, inventor Bone, which issued Aug. 2, 1977; U.S. Pat. No. 5,433,366, inventors Deschenes et al., which issued Jul. 18, 1995; U.S. Pat. No. 4,121,487, inventor Bone, which issued Oct. 24, 1978; U.S. Pat. No. 5,320,269, inventors Deschenes et al., which issued Jun. 14, 1994; U.S. Pat. No. 4,955,475, inventors McCarthy et al., which issued Sep. 11, 1990; U.S. Pat. No. 4,456,161, inventor Russell, which issued Jun. 26, 1984; U.S. Pat. No. 5,024,365, inventor Bourque, which issued Jun. 18, 1991; and U.S. Pat. No. 4,998,661, inventors Deschenes et al., which issued Mar. 12, 1991.

Such tools typically comprise a needle, the needle typically including a stem portion. The stem portion typically is generally cylindrical in shape and has a longitudinally-extending, cylindrically-shaped bore adapted to receive the first cross-bar of a fastener. In addition, said stem portion also typically has a longitudinally-extending slot adapted to permit the filament portion of a fastener to extend therethrough while the first cross-bar of the fastener is disposed in the longitudinal bore of the stem portion. The stem portion also typically has a tip adapted for insertion into a desired article of commerce. The needle also may include a base portion, said base portion being attached to the rear of the stem portion and being adapted to be removably received in the tool. The stem portion and the base portion may be a unitary structure or, as is more often the case, the base portion is insert-molded onto the rear end of the stem portion.

Such tools also typically comprise an ejector rod for ejecting a first cross-bar from the needle and into the article of commerce and may also include a knife or similar severing means for cutting the severable connector between the first cross-bar being dispensed and its adjacent first cross-bar and feeding means for advancing the assembly of fasteners in the tool so as to align the forwardmost first cross-bar with the needle.

It has been found by the inventors that the dispensing of continuously connected fastener stock of the type described in U.S. Pat. No. 4,462,784 through needles of the type described above in which the longitudinal bore and the longitudinal slot together have a symmetric transverse cross-sectional shape resembling an inverse lollipop (the longitudinal bore being circular in transverse cross-section, the longitudinal slot being rectangular in transverse cross-section and bisecting said longitudinal bore at the top thereof) introduces two significant drawbacks.

As a first drawback, the dispensing of fastener stock through the needle of a fastener dispensing tool in which the cross-bar and filament of the individual fasteners collectively have a "d" shape in lateral cross-section and in which the longitudinal bore of the needle is circular in lateral cross section can cause the fastener dispensing tool to malfunction. Specifically, because a considerable portion of the transverse cross-sectional area of the bore is not occupied by the cross-bar, proper engagement of the cross-bar by the ejector rod and proper translational movement of the cross-bar through the length of the bore due to action of the ejector rod is not always achieved, which is highly undesirable.

As a second drawback, the dispensing of fastener stock through the needle of a fastener dispensing tool in which the cross-bar and filament of the individual fasteners collectively have a "d" shape in lateral cross-section and in which the longitudinal bore of the needle is circular in lateral cross-section creates a considerable amount of unused space within the needle. This considerable amount of unused, or wasted, space within the needle serves to significantly increase the diameter of the needle. As can be appreciated, an increase in the size of the needle serves to increase the size of the corresponding insertion hole which is formed in the fastened article by the needle, which is highly undesirable.

SUMMARY OF THE INVENTION

It is an object of the present invention to provide a new method of manufacturing continuously connected fastener stock.

It is another object of the present invention to provide a method as described above that overcomes at least some of the problems described herein that are associated with existing methods for manufacturing continuously connected fastener stock.

According to one aspect of the invention, there is provided a method of manufacturing continuously connected fastener stock, said method comprising the steps of:
 (a) providing a rotating molding wheel, said rotating molding wheel being provided with a peripheral impression comprising a pair of peripherally-extending side members interconnected by a plurality of cross-links;
 (b) extruding molten plastic into the peripheral impression of said rotating molding wheel, with a layer of controlled film overlying the peripheral impression;
 (c) allowing the molten plastic to solidify;
 (d) using a knife in substantially elliptical contact with the peripheral impression to skive excess plastic from the rotating molding wheel, said knife having a bottom provided with a first cut-out portion aligned with one of said peripherally-extending side members so as to augment the transverse cross-sectional size thereof; and
 (e) removing the continuously connected fastener stock thus formed from the rotating molding wheel.

Preferably, the peripheral impression is formed around the entire periphery of the rotating molding wheel, and the bottom of said knife is further provided with a second cut-out portion aligned with the other of said peripherally-extending side members so as to augment the transverse cross-sectional size thereof.

In one embodiment, each of the peripherally-extending side members of said peripheral impression is generally uniform and semi-elliptical in transverse cross-section, each of said cross-links of said peripheral impression is generally semi-circular in transverse cross-section, and each of said first and second cut-out portions is complementarily shaped relative to its respective peripherally-extending side member of said peripheral impression so that each cross-link of the continuously connected fastener stock symmetrically bisects the side members of the continuously connected fastener stock.

In another embodiment, each of said peripherally-extending side members of said peripheral impression is generally rectangular in transverse cross-section, each of said cross-links of said peripheral impression is generally semi-circular in transverse cross-section, and each of said first and second cut-out portions is complementarily shaped relative to its respective peripherally-extending side member of said peripheral impression so that each cross-link of the continuously connected fastener stock symmetrically bisects the side members of the continuously connected fastener stock.

In yet another embodiment, each of said peripherally-extending side members of said peripheral impression is generally semi-circular in transverse cross-section and each of said cross-links of said peripheral impression is generally semi-circular in transverse cross-section, with the flat surfaces of the side member impressions lying flush with the flat surfaces of the cross-link impressions and with the curved surfaces of the side member impressions lying flush with the curved surfaces of the cross-link impressions. In addition, each of said first and second cut-out portions is semi-circular in transverse cross-section so that the side members of the continuously connected fastener stock are circular in transverse cross-section, with each cross-link of the continuously connected fastener stock asymmetrically bisecting the side members of the continuously connected fastener stock.

In still another embodiment, each of said peripherally-extending side members of said peripheral impression is generally semi-circular in transverse cross-section and is shaped to include a pair of opposing sloped surfaces, and each of said cross-links of said peripheral impression is generally semi-circular in transverse cross-section, the flat surfaces of said side member impressions lying flush with the flat surfaces of said cross-link impressions, the arcuate surfaces of said side member impressions extending beyond the arcuate surfaces of said cross-link impressions. In addition, each of said first and second cut-out portions is complementarily shaped relative to its respective peripherally-extending side member of said peripheral impression so that the side members of the continuously connected fastener stock are circular in transverse cross-section, with each cross-link of the continuously connected fastener stock asymmetrically bisecting the side members of the continuously connected fastener stock.

The present invention is also directed to a length of continuously connected fastener stock fabricated according to the above-described method and to individual fasteners derived from said continuously connected fastener stock.

Therefore, according to another aspect of the invention, there is provided a length of continuously connected fastener stock, said length of continuously connected fastener stock comprising (a) first and second side members; and (b) a plurality of cross-links interconnecting said first and second side members, each of said cross-links having a flat surface and an arcuate surface; (c) wherein said first side member is shaped to extend transversely beyond said flat surface.

According to still another aspect of the invention, there is provided a length of continuously connected fastener stock, said length of continuously connected fastener comprising (a) first and second side members; and (b) a plurality of cross-links interconnecting said first and second side members, each of said cross-links having a flat surface; (c) wherein said first side member is shaped to extend transversely beyond said flat surface with an arcuate surface.

According to a further aspect of the invention, there is provided a needle for use in a plastic fastener dispensing tool which is sized to have an overall diameter smaller than a conventional needle.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIG. 3 is a top view of a conventional needle adapted for use in dispensing fasteners, such as the plastic staple of FIG. 2;

FIG. 4 is a left side view of the needle shown in FIG. 3;

FIGS. 10(a) and 10(b) are side and perspective views, respectively, of a first embodiment of a skiving knife constructed according to the teachings of the present invention;

FIGS. 11(a) and 11(b) are side and perspective views, respectively, of a second embodiment of a skiving knife constructed according to the teachings of the present invention;

FIGS. 18(a) and 18(b) are side and perspective views, respectively, of a third embodiment of a skiving knife constructed according to the teachings of the present invention;

DETAILED DESCRIPTION OF PREFERRED EMBODIMENTS

Figure 1:
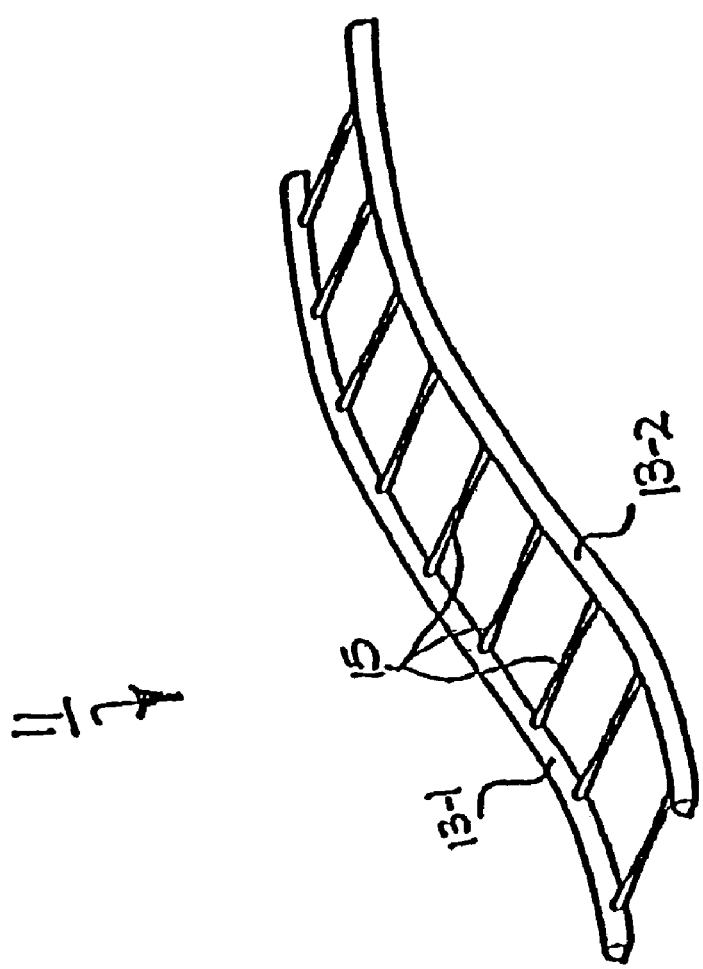
FIG. 1 is a perspective view of a length of continuously connected fastener stock of the plastic staple variety fabricated using the conventional rotary extrusion technique.

Referring now to FIG. 1, there is shown a perspective view of a length of continuously connected fastener stock of the plastic staple variety that has been fabricated using the conventional rotary extrusion technique described above, said length of fastener stock being represented generally by reference numeral 11.

Fastener stock 11, which is typically made of polyurethane, comprises two elongated, uniform and continuous side members 13-1 and 13-2. Side members 13-1 and 13-2 are coupled together by a plurality of flexible cross-links or filaments 15, cross-links 15 being equidistantly-spaced apart by a distance of 0.25 inch. By cutting side members 13-1 and 13-2 at appropriate points between cross-links 15, individual fasteners having an H-shape, often referred to as "plastic staples," are produced. Each of the cross-bars of an individual plastic staple has a length of 0.25 inch.

Figure 2:
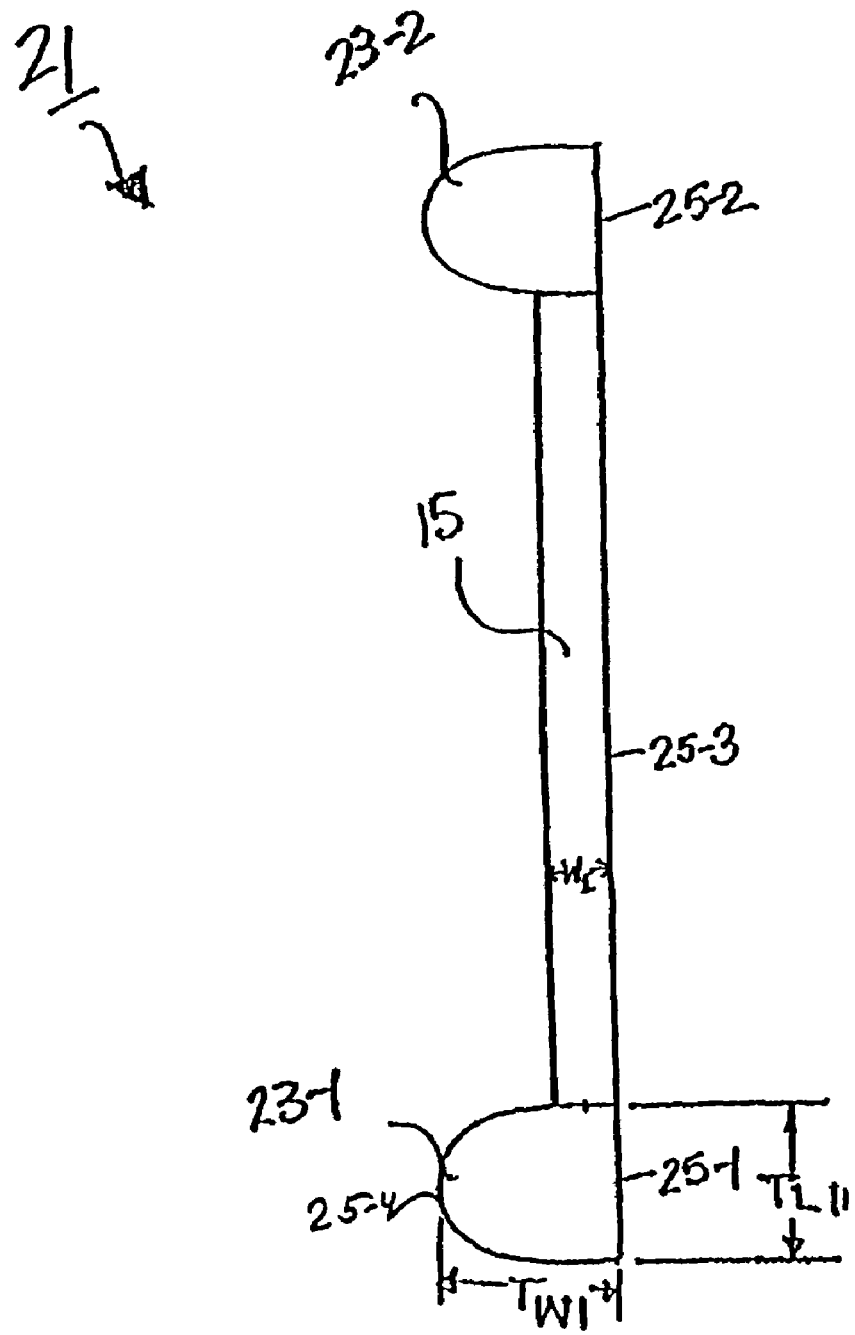
FIG. 2 is an enlarged end view of an individual plastic staple obtained from the length of conventional continuously connected fastener stock of FIG. 1.

Referring now to FIG. 2, there is shown an enlarged end view of an individual plastic staple obtained in the aforementioned manner from a length of fastener stock 11, the individual plastic staple being represented generally by reference numeral 21.

Staple 21 comprises a first cross-bar 23-1, which has been cut from side member 13-1, and a second cross-bar 23-2, which has been cut from side member 13-2, cross-bars 23-1 and 23-2 being interconnected by flexible filament 15. As can be seen, due to the conventional rotary extrusion process by which stock 11 is formed, cross-bars 23-1 and 23-2 and filament 15 are flat on sides 25-1, 25-2 and 25-3, respectively, sides 25-1, 25-2 and 25-3 being coplanar with one another. (The remaining surfaces of filament 15 and cross-bars 23-1 and 23-2 are curved.) As a result, as can be seen, cross-bar 23-1 and filament 15 collectively have a generally "d"-shape when viewed from an end, with cross-bar 23-1 having a substantially semi-oval shape in cross-section. Cross-bar 23-1 has a transverse width $Tw_1$ greater than its transverse length $Tl_1$. Filament 15 has a width $w_1$. Cross-bar 23-2 and filament 15 also collectively have a generally "d"-shape when viewed from an end, with cross-bar 23-2 being sized and shaped identically to cross-bar 23-1.

Referring now to FIGS. 3 and 4, there are shown top and left side views, respectively, of a conventional needle adapted for use in dispensing fasteners, such as the plastic staple of FIG. 2, said needle being represented generally by reference numeral 51.

Needle 51 comprises a stem portion 53 and a base portion 55. Stem portion 53 may be made, for example, by stamping and rolling or by machining a piece of metal (e.g., stainless steel) or by the electroforming/machining technique described in U.S. Pat. No. 5,489,057, inventor Deschenes, issued Feb. 6, 1996, the disclosure of which is incorporated herein by reference.

Figure 5:
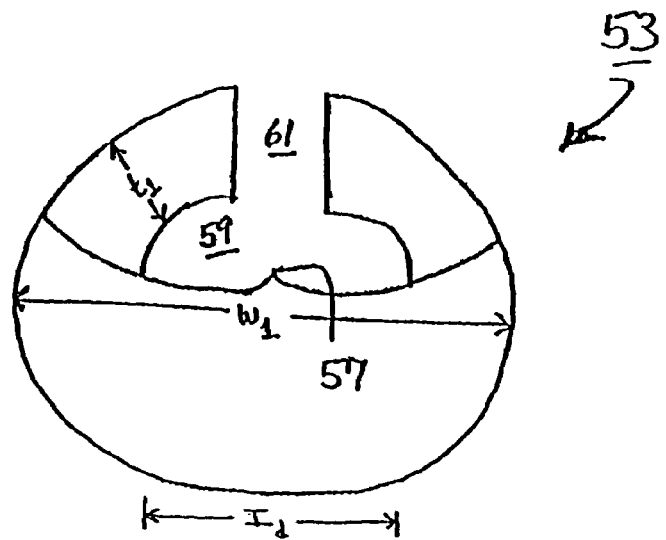
FIG. 5 is a front view of the stem portion of the needle shown in FIG. 3.

Referring now to FIGS. 3 through 5, stem portion 53 can be seen to be an elongated member that is substantially cylindrical over most of its length (and annular in transverse cross-section). The front end of stem portion 53 is formed into a spoon-shaped tip 57, tip 57 being sufficiently sharp to enable its penetration into a desired article of commerce. A generally cylindrical bore 59 extends longitudinally across substantially the entire length of stem portion 53. Bore 59 is appropriately dimensioned to receive a cross-bar of a plastic fastener, such as cross-bar 23-1 of plastic staple 21. Stem portion 53 is also shaped to include a slot 61 extending longitudinally across substantially the entire length of stem portion 53, slot 61 being appropriately dimensioned to permit a filament, such as filament 15, to extend therethrough while its associated cross-bar is disposed within bore 59.

A conventional stamped and rolled stainless steel stem portion 53 used in the dispensing of plastic staples 21 typically has a width $w_1$ of about 0.068 inch, a cross-sectional thickness $t_1$ of about 0.013-0.0165 inches, and an inside diameter $I_d$ of about 0.037-0.040 inches.

Referring back to FIGS. 3 and 4, base portion 55 is made in the conventional manner by insert-molding plastic onto the rear end 60 of stem portion 53. Base portion 55, which is generally cylindrical in shape, includes a generally cylindrically-shaped longitudinal bore aligned with (and sized similarly to) bore 59 of stem portion 53 and also includes a longitudinal slot aligned with (and sized similarly to) slot 61 of stem portion 53. Base portion 55 is provided with a recessed area 63 for use in correctly positioning needle 51 within a fastener dispensing tool and for locking the same into place.

Figure 6:
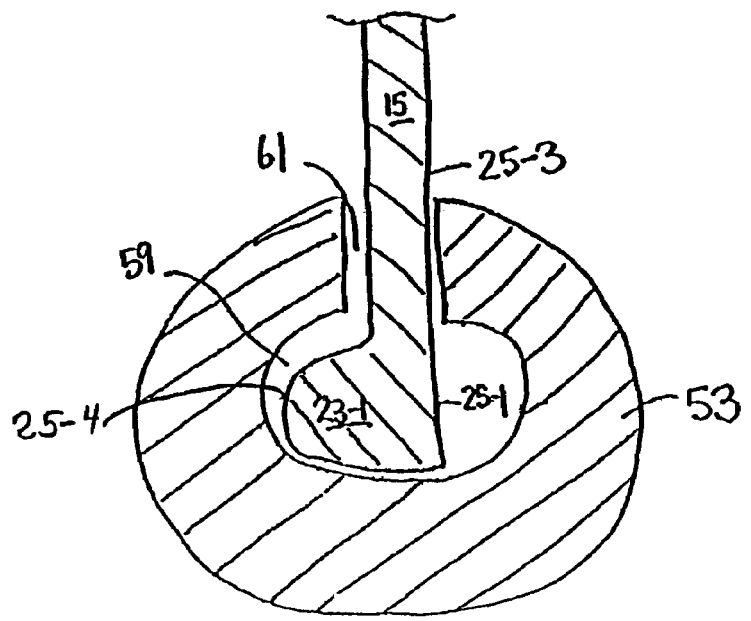
FIG. 6 is a transverse section view of the stem portion of the needle of FIG. 3, the plastic staple of FIG. 2 being disposed therewithin.

Referring now to FIG. 6, there is shown a transverse section view of stem portion 53, with plastic staple 21 being loaded therein. As described above, the present inventors have noted that, because filament 15 and cross-bar 23-1 are flat on sides 25-3 and 25-1, respectively, whereas bore 59 is circular in transverse cross-section and slot 61 bisects bore 59 from the top thereof, a considerable portion of bore 59 is left unoccupied by staple 21. Consequently, because cross-bar 23-1 is much smaller than bore 59 and has considerable freedom to move laterally within bore 59, the proper translational movement of cross-bar 23-1 through bore 59 during ejection cannot be assured. Furthermore, because cross-bar 23-1 is much smaller than bore 59, the overall diameter of needle 51 is unnecessarily large, which is highly undesirable.

Figure 7:
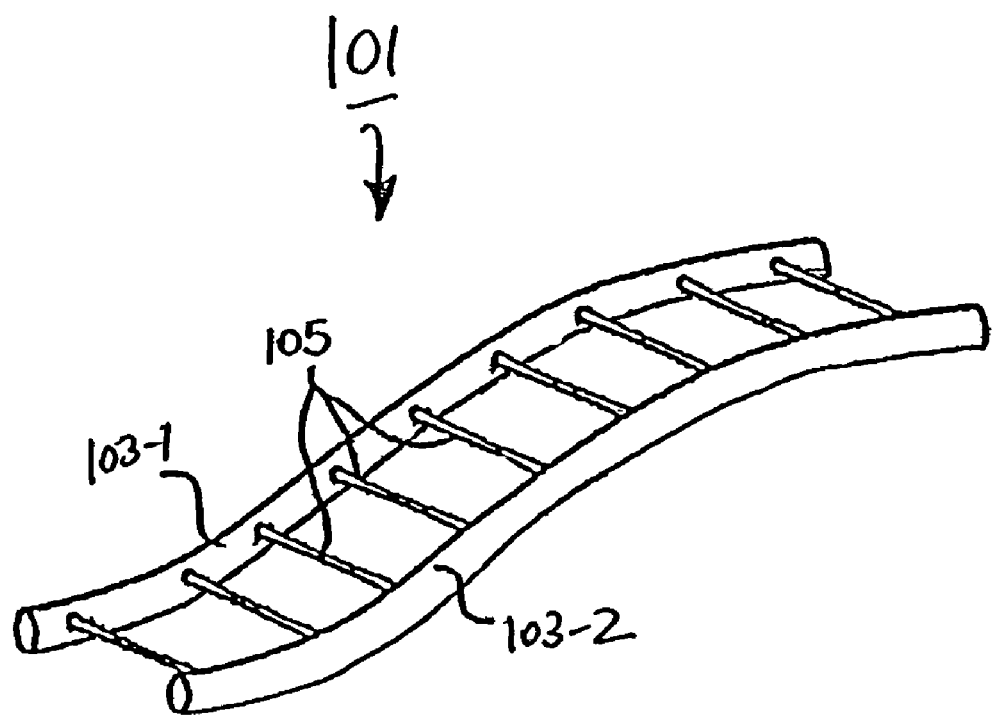
FIG. 7 is a perspective view of a first embodiment of a length of plastic staple stock constructed according to the teachings of the present invention.
Figure 8:
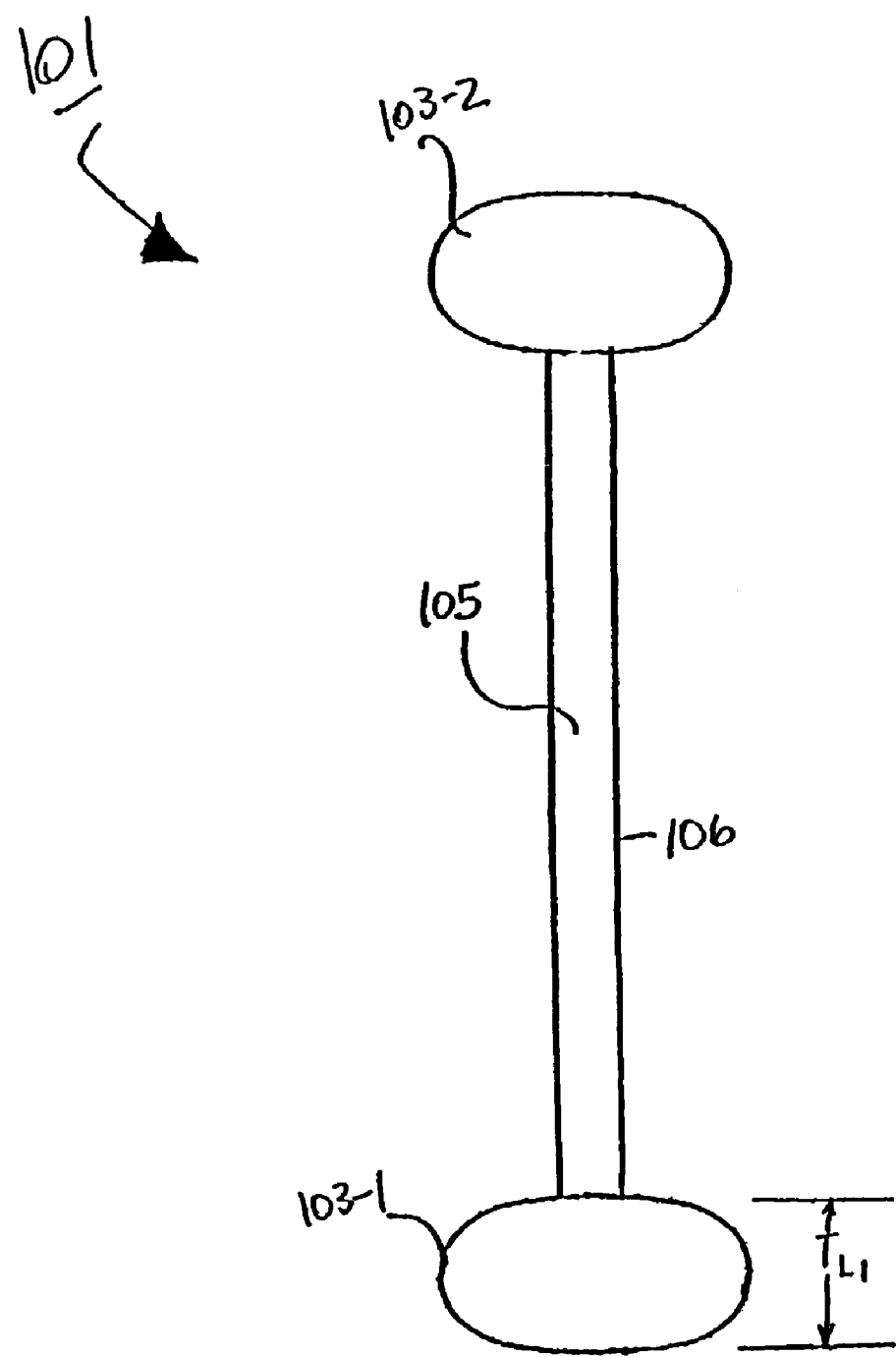
FIG. 8 is an end view of the length of plastic staple stock shown in FIG. 7.

Referring now to FIGS. 7 and 8, there are shown perspective and end views, respectively, of a length of continuously connected fastener stock of the plastic staple variety that has been fabricated in accordance with the teachings of the present invention, said length of fastener stock being represented generally by reference numeral 101.

Figure 9:
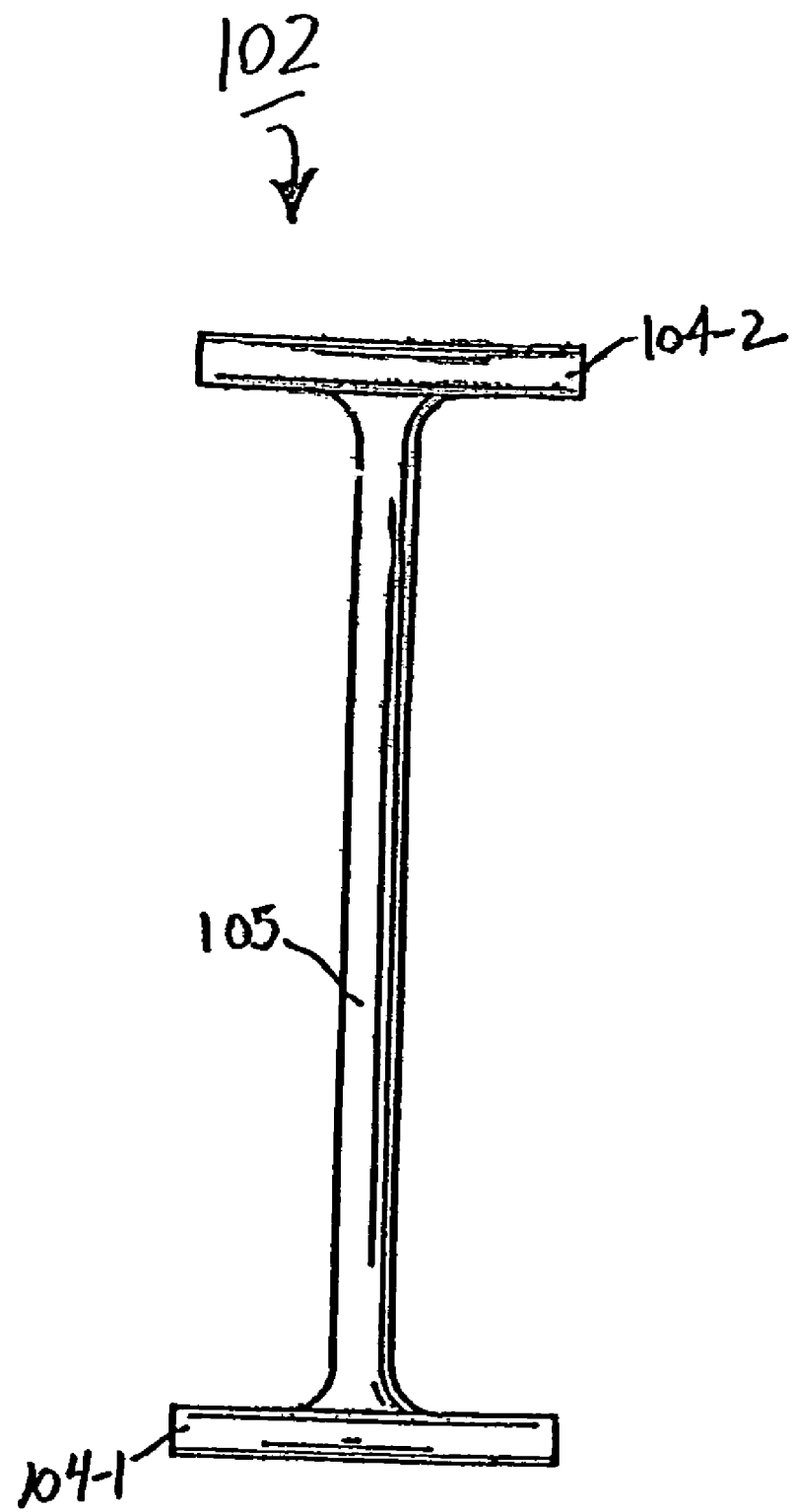
FIG. 9 is an enlarged side view of an individual plastic staple obtained from the length of plastic staple stock of FIG. 7.

Fastener stock 101 is similar in many respects to fastener stock 11, fastener stock 101 comprising a pair of elongated, uniform and continuous side members 103-1 and 103-2 that are coupled together by a plurality of flexible cross-links 105 equidistantly-spaced apart by a distance of 0.25 inch. (It should be understood that the distance between adjacent cross-links 105 need not be 0.25 inch and may be, for example, about 0.18 inch. Such a modification in cross-link spacing would, however, require the use of a molding wheel having a correspondingly formed impression. A pitch of about 0.18 inch is believed by the present inventors to be preferred over a pitch of 0.25 inch in that a greater number of fasteners can be formed over a given length. A pitch smaller than about 0.18 inch is believed by the present inventors to have the disadvantage of resulting in a cross-bar that too easily deforms (i.e. "Y-s") when a pulling force is applied to the filament connected to the cross-bar. This problem is exacerbated where the stock is made of a material, like urethane, that is flexible.) An individual plastic fastener 102 that has been cut from fastener stock 101 is shown separately in FIG. 9 and can be seen to include a pair of cross-bars 104-1 and 104-2 interconnected by a cross-link 105.

As seen best in FIG. 8, fastener stock 101 differs significantly from fastener stock 11 in that side members 103-1 and 103-2 do not have a flat side. (Cross-link 105, however, does have a flat side 106 that is similar to side 25-3 of filament 15.) Instead, side members 103-1 and 103-2 are elliptical in transverse cross-section, with cross-links 105 symmetrically bisecting side members 103-1 and 103-2.

One of the advantages of stock 101, as compared to stock 11, is that side members 103 (and the individual cross-bars derived therefrom) have a cross-sectional transverse shape that corresponds more closely to that of bore 59 of needle 51 than do side members 13. (Some proportional scaling down of the cross-sectional size of members 103 may be needed to permit the generally elliptically-shaped cross-bars derived from member 103 to fit properly within circularly-shaped bore 59.) Consequently, improved engagement of the cross-bar by the ejector rod and improved translational movement of the cross-bar through the length of bore 59 is made possible.

Fastener stock 101 may be fabricated by the conventional rotary extrusion method used to make stock 11, with one notable exception. Instead of being made using a conventional skiving knife, which has a straight bottom surface or edge (hence, flat sides 25-1, 25-2 and 25-3 of fastener stock 11), fastener stock 101 is made using the skiving knife of FIGS. 10(a) and 10(b), said skiving knife being constructed in accordance with the teachings of the present invention and being represented generally by reference numeral 111.

As can be seen best in FIG. 10(b), knife 111 includes a bottom edge 113, bottom edge 113 being provided with a pair of cut-away portions 115-1 and 115-2, cut-away portions 115-1 and 115-2 being appropriately spaced apart to permit their alignment with the impressions used to make side members 13-1 and 13-2, respectively. In the present embodiment, cut-away portions 115-1 and 115-2 are complementarily shaped relative to side members 13-1 and 13-2, respectively, so that filament 105 symmetrically bisects side members 103-1 and 103-2. It should be understood, however, that cut-away portions 115-1 and 115-2 need not be shaped in this manner and may assume virtually any shape. For example, cut-away portions 115-1 and 115-2 may be shaped to match the transverse cross-sectional shape of side members 13-1 and 13-2, respectively, so that the filament of the resultant fastener stock asymmetrically bisects the side members. It should also be understood that one of cut-away portions 115-1 and 115-2 could be eliminated entirely if one wished to provide only one of side members 13-1 and 13-2 with a non-flat geometry. This may be desirable, for example, where the continuously connected fastener stock is not of the plastic staple variety, but rather, is of the type wherein one of the side members is shaped to include a plurality of cross-bars interconnected end-to-end by severable connectors and the other of the side members is shaped to include a plurality of paddles interconnected end-to-end by severable connectors.

Referring now to FIGS. 11(a) and 11(b), there are shown side and perspective views, respectively, of a second embodiment of a skiving knife constructed according to the teachings of the present invention, said skiving knife being represented generally by reference numeral 201.

Figure 12:
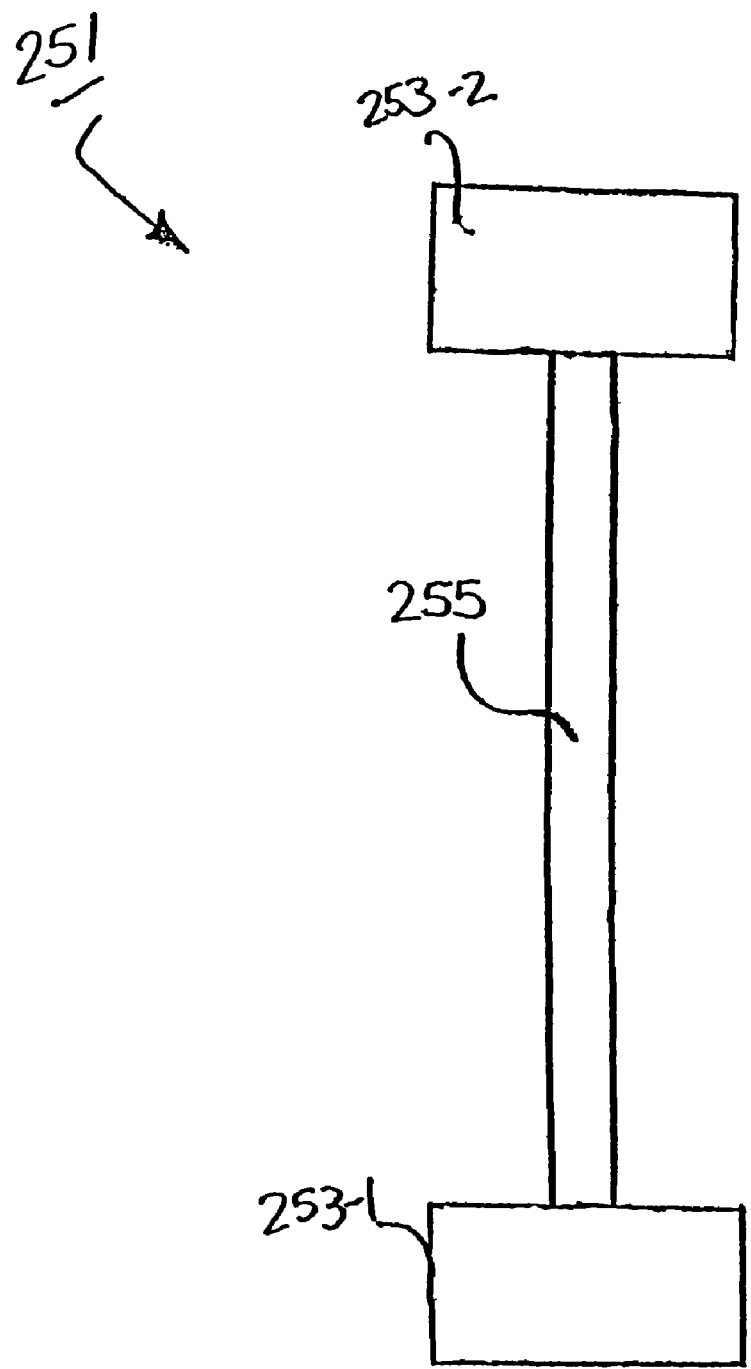
FIG. 12 is an end view of a second embodiment of a length of plastic staple stock constructed according to the teachings of the present invention.
Figure 13:
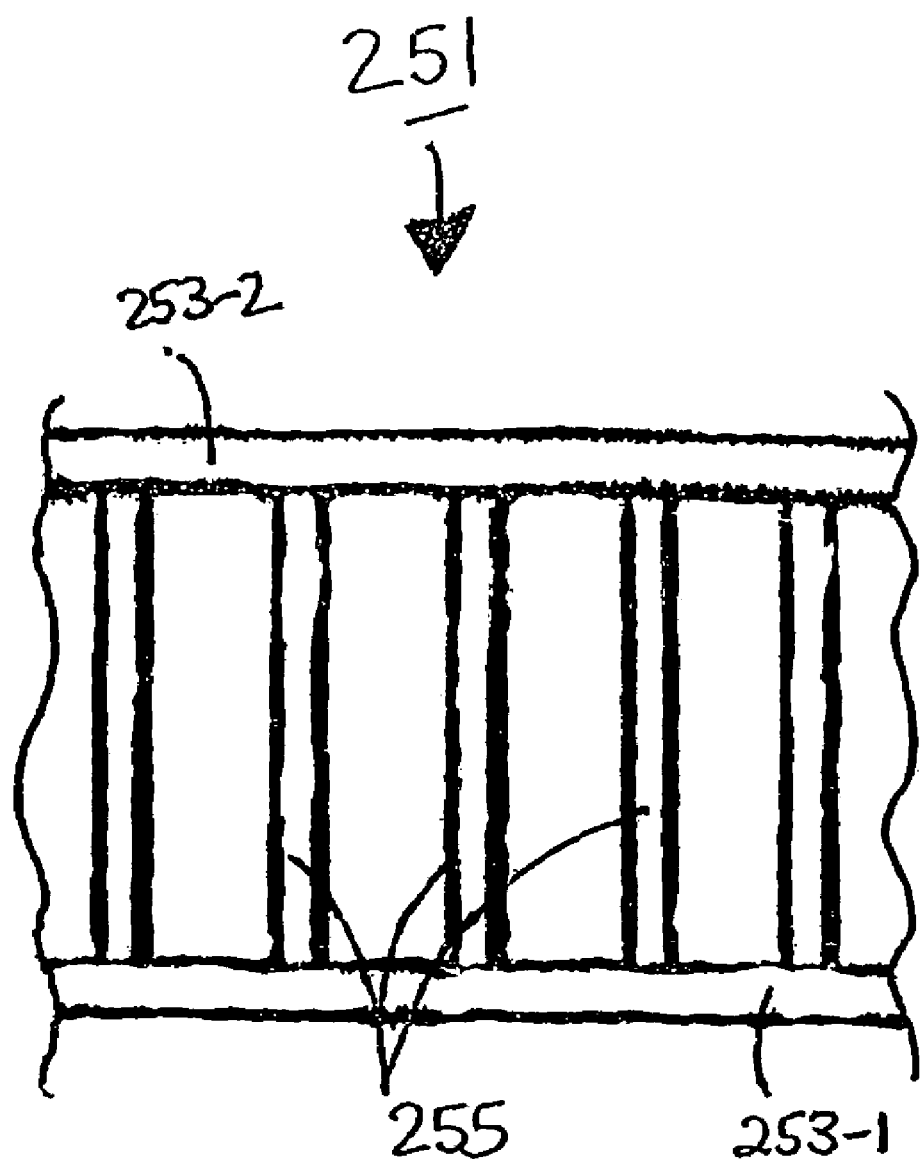
FIG. 13 is a fragmentary front view of the length of plastic staple stock shown in FIG. 12.

As seen best in FIG. 11(b), skiving knife 201 is similar in many respects to skiving knife 111, the principal difference between the two knives being that skiving knife 201 is provided with a bottom edge 203 having a pair of rectangular cut-away portions 205-1 and 205-2, as compared to the arcuate cut-away portions 115-1 and 115-2 of knife 111. Knife 201 is adapted for, but is not limited to, use in combination with a modified molding wheel whose side member impressions are rectangular, as opposed to semi-elliptical, in transverse cross-section and whose cross-link impressions include a rounded surface. An example of a length of plastic staple stock fabricated using knife 201 and a molding wheel as described above is shown in FIGS. 12 and 13, said length of stock being represented generally by reference numeral 251. Stock 251 comprises a pair of side members 253-1 and 253-2 of rectangular transverse cross-section interconnected by a plurality of equidistantly-spaced cross-links 255 of a truncated cylindrical or semi-cylindrical transverse cross-section.

Stock 251 may be used with needle 51, with some proportional scaling down of the cross-sectional size of members 253 possibly being needed to permit the cross-bars derived from members 253 to fit properly within bore 59. Alternatively, a needle having a rectangularly-shaped bore may be used, instead of needle 51, with stock 251.

Although cross-links 255 symmetrically bisect side-members 253-1 and 253-2 in the embodiment shown, it can readily be appreciated that, by modifying the size and/or shape of cut-away portions 205-1 and 205-2, a length of fastener stock can be obtained in which cross-links 255 asymmetrically bisect the resultant side members. Furthermore, it should be understood that fastener stock having side members of a variety of alternative transverse cross-sectional shapes can be obtained by appropriately shaping the side member impressions in the molding wheel and the cutaway portions in the skiving knife.

Figure 14:
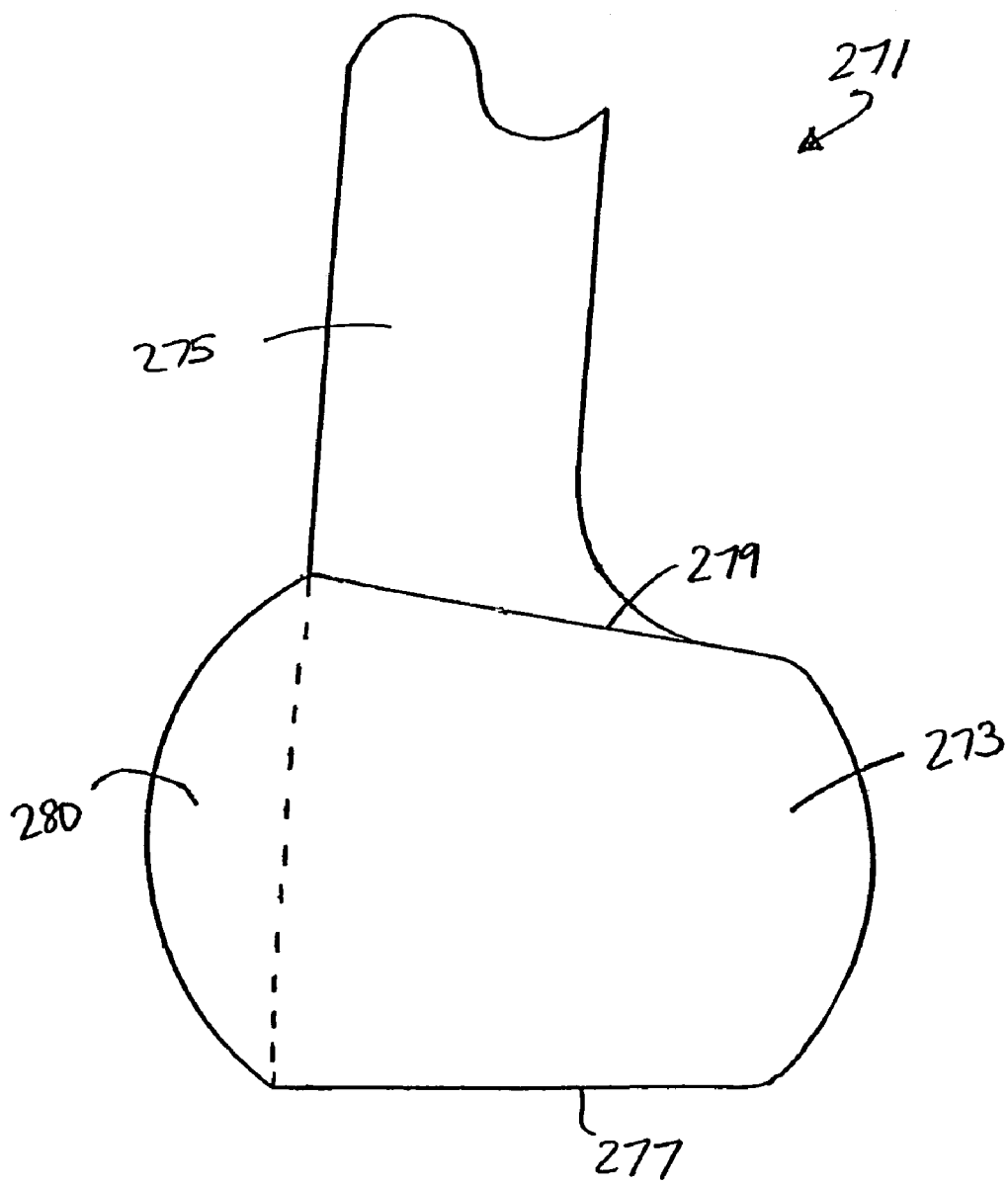
FIG. 14 is an enlarged fragmentary end view of a third embodiment of a length of plastic staple stock constructed according to the teachings of the present invention.

Specifically, referring now to FIG. 14, there is shown an enlarged fragmentary end view of another embodiment of a length of continuously connected fastener stock of the plastic staple variety that has been fabricated in accordance with the teachings of the present invention, said length of fastener stock being represented generally by reference numeral 271.

Fastener stock 271 is similar in many respects to fastener stock 101, fastener stock 271 comprising a pair of elongated, uniform and continuous side members 273 (only one of said pair of side members 273 being shown, the other of said pair of side members being a mirror image thereof) that are coupled together by a plurality of flexible, equidistantly-spaced cross-links 275. Preferably, cross-links 275 are spaced apart by a distance of 0.18 inch to yield individual fasteners whose cross-bars have a length of 0.18 inch. Fastener stock 271, like fastener stock 101, is preferably made of urethane.

Fastener stock 271 differs notably from fastener stock 101 in that the cross-sectional shape of side members 273 is generally circular, as opposed to the generally elliptical shape of side members 103. In addition, each of side members 273 is shaped to include an outer flattened surface 277 and an inner flattened surface 279, surfaces 277 and 279 being angled in opposing directions. Surfaces 277 and 279 are provided in side members 273 to enable the fastener stock to be more easily removed (i.e., peeled off) from the cavities of the mold wheel during the fabrication process.

Stock 271 is formed a manner analogous to that used to form stock 101, the notable difference being that the shape of the mold wheel impression and the shapes of the skiving knife cut-outs are different for stocks 101 and stock 271. That portion of side member 273 that is attributable to the cut-out of the skiving knife used to make stock 271 is designated in FIG. 14 by reference numeral 280.

Figure 15:
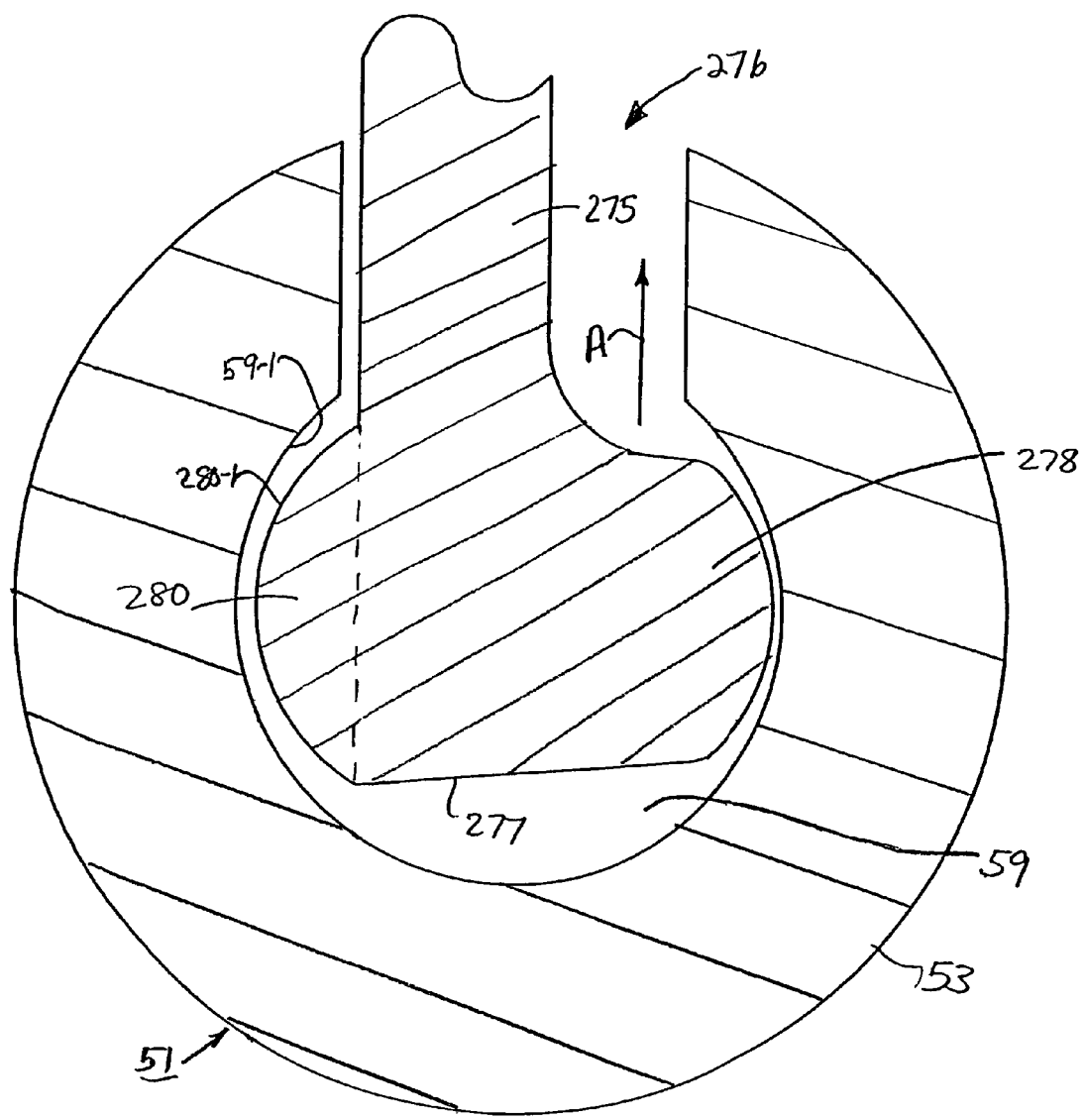
FIG. 15 is a transverse section view of the stem portion of the needle of FIG. 3, with an individual fastener from the plastic staple stock of FIG. 14 being disposed therewithin.

Referring now to FIG. 15, an individual fastener 276 derived from fastener stock 271 is shown with its cross-bar 278 disposed within bore 59 of needle 51. As can be seen, due to the addition of portion 280, cross-bar 278 more completely fills bore 59 than it otherwise would have. This reduction in unused space within bore 59 is desirable as it means that cross-bar 278 is more likely to be properly engaged by an ejector rod and moved translationally through bore 59 in a proper manner. Furthermore, the addition of portion 280 will better retain cross-bar 278 within bore 59 since any upward movement of fastener 276 within stem portion 53 of needle 51 (in the direction of arrow A) will case surface 280-1 as well as surface 278-1 to hit up against sidewall 59-1 of bore 59. However, one disadvantage to the addition of portion 280 to cross-bar 278 is that the fabrication of cross-bar 278 requires more plastic than a cross-bar which is lacking portion 280 (or more than cross-bar 23). Such an increase in materials, when extrapolated for a high volume of stock, can result in a considerable increase in manufacturing cost.

Figure 16:
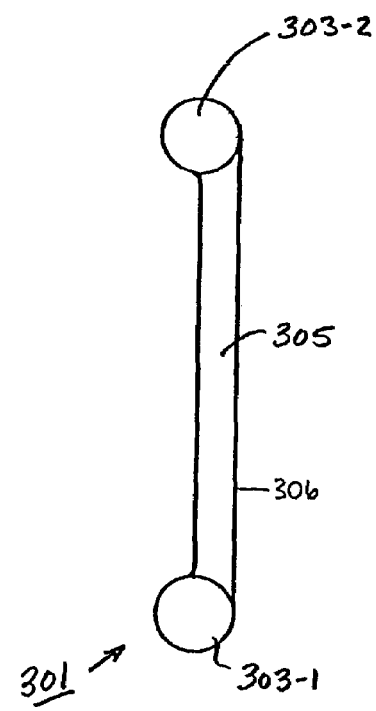
FIG. 16 is an end view of a fourth embodiment of a length of plastic staple stock constructed according to the teachings of the present invention.

Referring now to FIG. 16, there is shown an end view of a fourth embodiment of a length of continuously connected fastener stock of the plastic staple variety that has been fabricated in accordance with the teachings of the present invention, said length of fastener stock being represented generally by reference numeral 301.

Fastener stock 301 is similar to fastener stock 101 in that fastener stock 301 comprises a pair of elongated, uniform and continuous side members 303-1 and 303-2 that are coupled together by a plurality of flexible cross-links 305 that are equidistantly-spaced apart. Preferably, cross-links 305 are spaced apart by a distance of 0.18 inch. Fastener stock 301 like stock 101 is preferably constructed of urethane.

Figure 17:
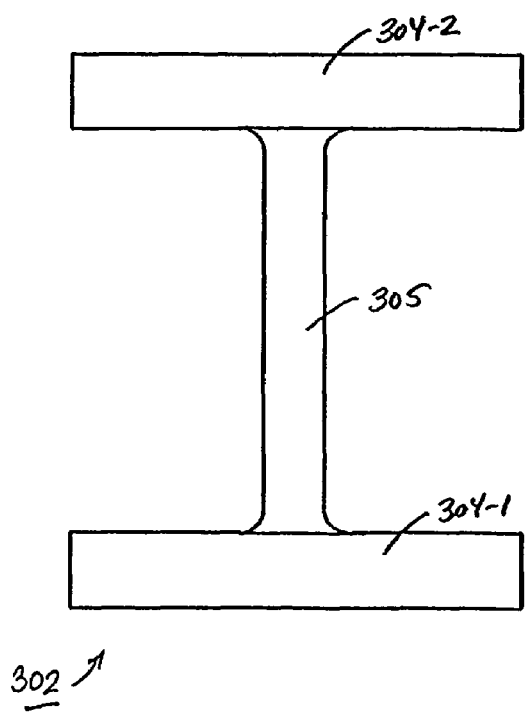
FIG. 17 a side view of an individual plastic staple obtained from the length of plastic staple stock of FIG. 16.

An individual plastic fastener 302 that has been cut from fastener stock 301 is shown separately in FIG. 17 and can be seen to include a pair of cross-bars 304-1 and 304-2 interconnected by a cross-link 305. As can be appreciated cross-bars 304-1 and 304-2 have a length of 0.18 inches.

As seen best in FIG. 16, fastener stock 301 differs from fastener stock 101 in two principal ways. First, side members 303-1 and 303-2 of fastener stock 301 are circular in transverse cross-section with a diameter of about 0.030 inches whereas side members 103-1 and 103-2 of fastener stock 101 are elliptical in transverse cross-section. Second, cross-links 305 of fastener stock 301 asymmetrically bisect side members 303-1 and 303-2 whereas cross-links 105 of fastener stock 101 symmetrically bisect side members 103-1 and 103-2. In fact, as can be seen, edge 306 of cross link 305 lies flush with side members 303-1 and 303-2.

One of the advantages of stock 301 over stock 11 and stock 101 is that side members 303 (and the individual cross-bars derived therefrom) have a cross-sectional transverse shape that more closely conforms to the circular transverse shape of bore 59 of needle 51. Consequently, less wasted space is present in bore 59 and improved engagement of the cross-bar by the ejector rod and improved translational movement of the cross-bar through the length of bore 59 is made possible.

Another desirable property of stock 301 is that side members 303, while having a much different shape than conventional side members 13, have a cross-sectional area that substantially matches that of conventional side members 13. Consequently, side members 303 do not require an increase in manufacturing materials.

Fastener stock 301 may be fabricated in a manner similar to that used to make fastener stock 101. One notable difference is that, instead of using skiving knife 111, skiving knife 311, which is shown in FIGS. 18(a) and 18(b), is used. Another difference is that a mold which has an appropriately shaped impression is used, said impression preferably defining cross-links 305 and side members of semi-circular transverse cross-section. As seen best in FIG. 18(b), skiving knife 311 is similar in many respects to skiving knife 111, the principal difference between the two knives being that skiving knife 311 is provided with a bottom edge 313 having a pair of generally semi-circular cut-away portions 315-1 and 315-2, as compared to the semi-elliptical cut-away portions 115-1 and 115-2 of knife 111.

Figure 19:
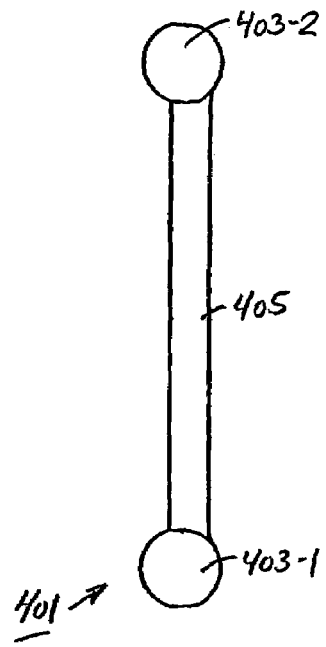
FIG. 19 is an end view of a fifth embodiment of a length of plastic staple stock constructed according to the teachings of the present invention.

Referring now to FIG. 19, there is shown an end view of another embodiment of a length of continuously connected fastener stock of the plastic staple variety that has been fabricated in accordance with the teachings of the present invention, said length of fastener stock being represented generally by reference numeral 401.

Fastener stock 401 is similar to fastener stock 301 in that fastener stock 401 comprises a pair of elongated, uniform and continuous side members 403-1 and 403-2 that are coupled together by a plurality of flexible, equidistantly-spaced apart cross-links 405. Preferably, cross-links 405 are spaced apart by a distance of 0.18 inches. Fastener stock 401 is preferably constructed of urethane.

Figure 20:
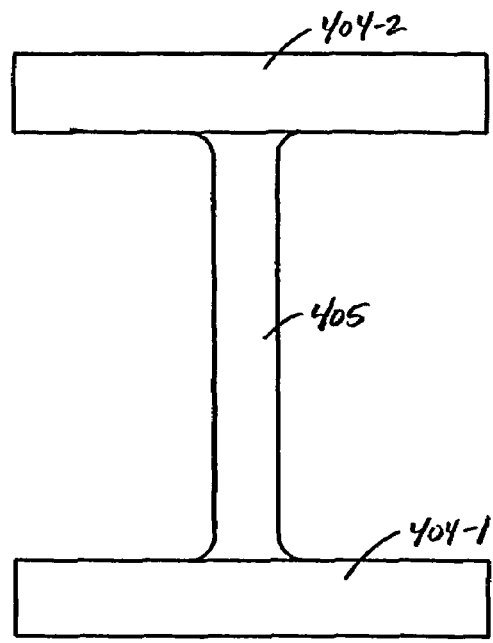
FIG. 20 is a side view of an individual plastic staple obtained from the length of plastic staple stock of FIG. 19.

An individual plastic staple 402 that has been cut from fastener stock 401 is shown separately in FIG. 20 and can be seen to include a pair of cross-bars 404-1 and 404-2 interconnected by a cross-link 405.

Fastener stock 401 differs from fastener stock 301 in two principal ways. First, side members 403-1 and 403-2 of fastener stock 401 are generally circular in transverse cross-section but are shaped to include a pair of flat surfaces 407 and 409 whereas side members 303-1 and 303-2 of fastener stock 101 are completely circular in transverse cross-section. Second, cross-links 405 of fastener stock 401 asymmetrically bisect side members 403-1 and 403-2 at a different location than where cross-links 305 of fastener stock 301 asymmetrically bisect side members 303-1 and 303-2. More specifically, cross-links 405 do not lie flush with side members 403-1 and 403-2.

Figure 21:
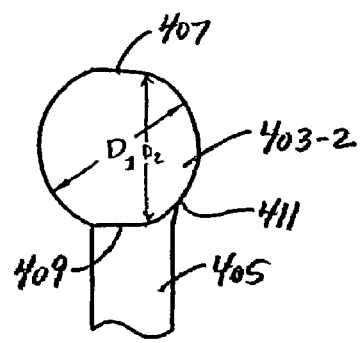
FIG. 21 is an enlarged fragmentary end view of the length of plastic staple stock of FIG. 19.

With respect to the first difference, as seen best in FIG. 21 side member 403-2 includes an outer flattened surface 407 and an inner flattened surface 409, flattened surfaces 407 and 409 being oppositely sloped. The purpose of flattened surfaces 407 is to enable the fastener stock to be more easily removed (i.e. peeled off) from the cavities of the mold wheel during the fabrication process. Preferably, the diameter $D_1$ of each side member 403 is 0.032 inch and the shortest distance $D_2$ between outer flattened surface 407 and inner flattened surface 409 is 0.030 inch.

With respect to the second difference, cross-links 405 of fastener stock 401 asymmetrically bisect each side member 403 at a location closer to the center of side member 403 than where cross-links 305 of fastener stock 301 asymmetrically bisect side members 303. As a result, a rounded notch 411 extends laterally at the junction between cross-links 405 and each side member 403. As can be appreciated, the laterally extending shape of side members 403 on both sides of cross links 405 helps to prevent side member 403 from being inadvertently withdrawn from bore 59 of needle 51, which is highly desirable. Also, because cross-link 405 is more centrally located relative to side member 403 than is the case with cross-link 305 and side member 303, cross-link 405 need not be bent as severely to pass through slot 61 of needle 51 as is the case with cross-link 305.

It should be noted that a principal advantage of stock 401 over stock 11 is that side members 403 (and the individual cross-bars derived therefrom) have a cross-sectional transverse shape that more closely conforms to the circular transverse shape of bore 59 of needle 51. In fact, providing side members 403 with the aforementioned shape leads to two significant benefits.

As a first benefit, by reducing the amount of unused space within bore 59, side members 403 permit improved engagement with an ejector rod, thereby resulting in better translational movement of the cross-bar through the length of bore 59.

As a second benefit, by shaping side members 403 to correspond to the overall shape of bore 59 of needle 51 while keeping the cross-sectional area of side members 403 the same as that for side members 13, one can then design a needle having a smaller diameter, thereby leading to a smaller insertion hole.

Figure 22:
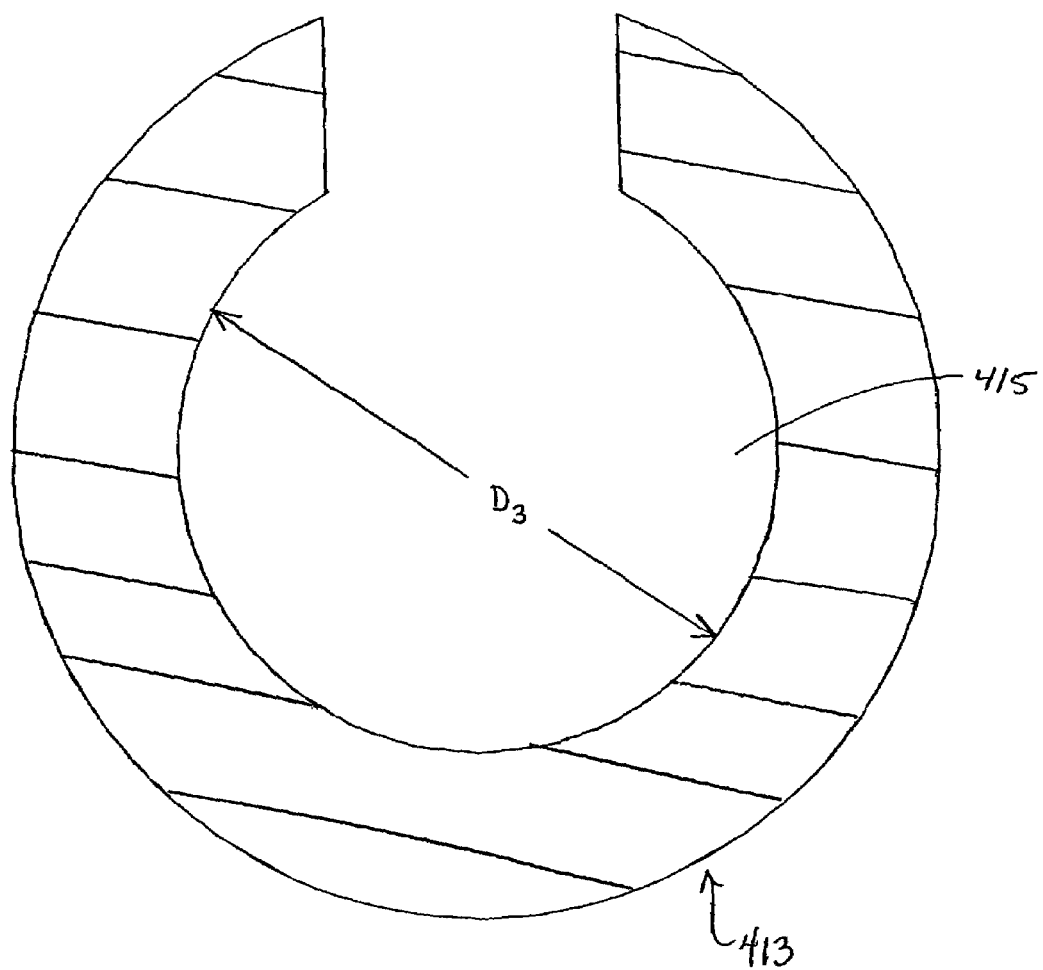
FIG. 22 is a transverse section view of the stem portion of a needle constructed according to the teachings of the present invention.

Referring now to FIG. 22, there is shown a transverse section view of the stem portion of a reduced sized needle constructed according to the teachings of the present invention, the needle being identified by reference numeral 413. Needle 413 differs from conventional needles, such as needle 51, in that needle 413 is shaped to define a bore 415 which is considerably smaller in diameter than the bore of conventional needles used in fastener dispensing applications. Specifically, needle 413 and is shaped to define a bore 415 having an inside diameter of about 0.032 inches, wherein, as noted above, the bore in a conventional needle is about 0.037 to 0.040 inches. It should be noted that the considerable reduction in the diameter of the bore is achievable without compromising the strength of the needle, which is highly desirable.

Figure 23:
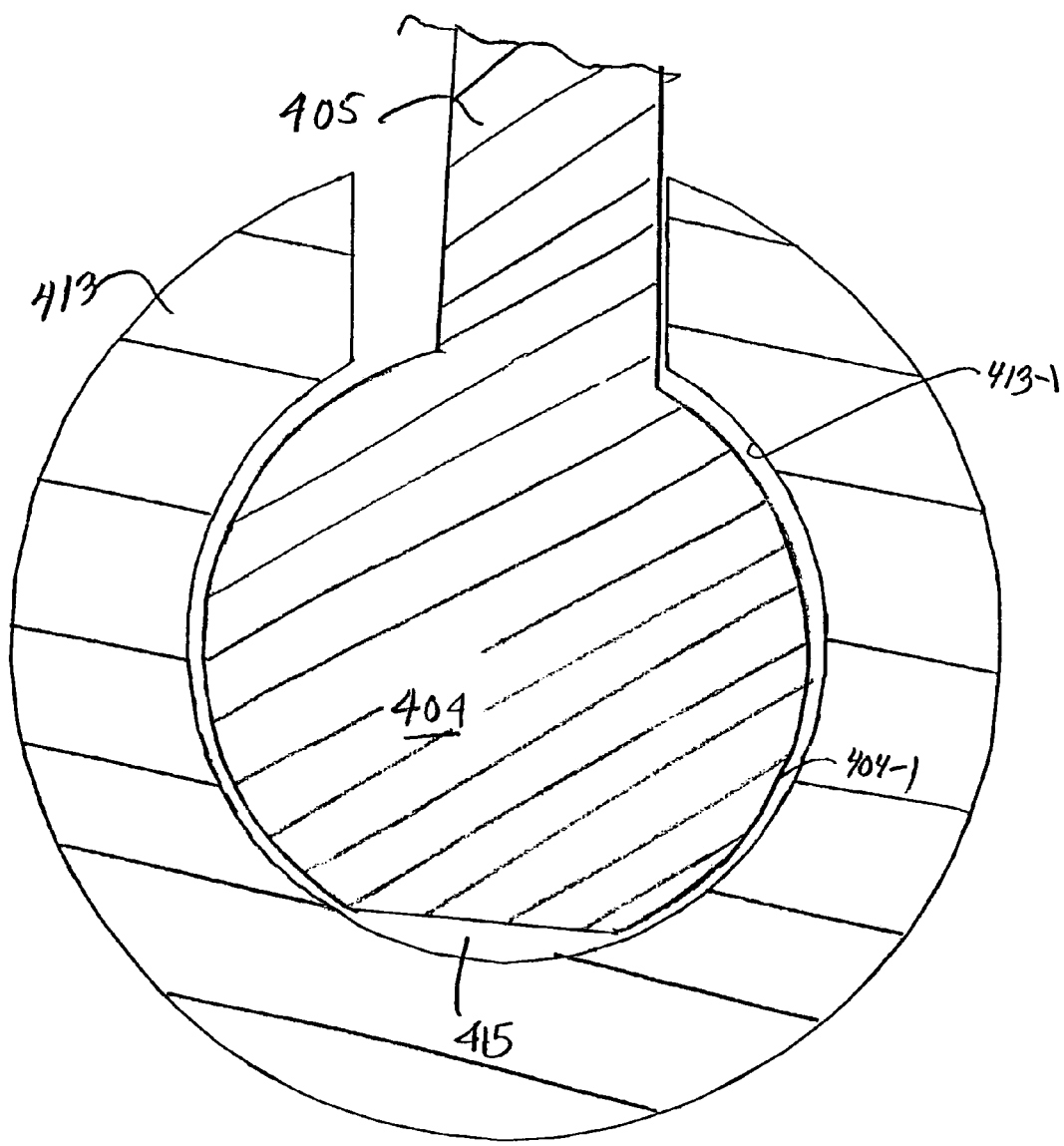
FIG. 23 is a section view showing an individual fastener from the fastener stock of FIG. 19 within the stem portion of the needle of FIG. 22.

A section view showing an individual plastic staple 402 within bore 415 of needle 413 is shown in FIG. 23.

As can be seen by having a cross-bar 404 that is circular in cross-section rather than a cross-bar having a flat side 25-1 and an arcuate side 25-4 as shown in FIG. 2, cross-bar 404 will better be retained within bore 415 since any upward movement of cross-bar 404 will cause a greater portion of surface 404-1 to hit up against the inner wall 413-1 of needle 413 than would occur if the cross-bar were shaped as shown in FIG. 2.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A length of continuously connected fastener stock comprising:
   (a) first and second side members; and
   (b) a plurality of cross-links interconnecting said first and second side members, each of said cross-links having a length, a flat surface and an arcuate surface;
   (c) wherein said first side member is shaped to extend transversely beyond said flat surface of said cross-links in a direction away from said arcuate surface of said cross-links and wherein said first side member is generally circular with at least one flattened surface when viewed in transverse cross-section taken in a direction along the length of said cross-links.

2. The length of continuously connected fastener stock as claimed in claim 1 wherein each of said cross-links is generally semi-circular in transverse cross-section.

3. The length of continuously connected fastener stock as claimed in claim 2 wherein said second side member is shaped to extend transversely beyond said flat surface.

4. The length of continuously connected fastener stock as claimed in claim 3 wherein said first and second side members are substantially identical in size and shape.

5. The length of continuously connected fastener stock as claimed in claim 1 wherein said first side member is generally circular with a pair of flattened surfaces in transverse cross-section.

6. The length of continuously connected fastener stock as claimed in claim 1 wherein each of said cross-links asymmetrically bisects said first side member transversely.

7. A length of continuously connected fastener stock comprising:
   (a) first and second contiuously side members wherein said first side member is generally circularly shaped with a pair of flattened surfaces in transverse cross-section, said first side member being shaped to include a plurality of cross-bars interconnected in an end-to-end fashion; and
   (b) a plurality of cross-links interconnecting said first and second side members, each of said cross-links having a flat surface;
   (c) wherein said first side member is shaped to extend transversely beyond said flat surface of said cross-links with an arcuate surface.

8. A length of continuously connected fastener stock comprising:
   (a) first and second continuously side members, wherein said first side member is generally circular in transverse cross-section and is shaped to include a plurality of cross-bars interconnected in an end-to-end fashion; and
   (b) a plurality of cross-links interconnecting said first and second side members, each of said plurality of cross-links asymmetically bisecting said first and second cross bars.

9. The length of continuously connected fastener stock as claimed in claim 8 wherein said first side member is generally circular with at least one flattened surface in transverse cross-section.

10. The length of continuously connected fastener stock as claimed in claim 9 wherein said first side member is generally circular with a pair of flattened surfaces in transverse cross-section.

11. A length of continuously connected fastener stock comprising:
    (a) first and second side members, wherein said first side member is generally circular in transverse cross-section; and
    (b) a plurality of cross-links interconnecting said first and second side members, wherein each of said cross-links has a first edge that lies flush with said first and second side members and a second edge that does not lie flush with said first and second side members.

* * * * *